(12) United States Patent
Chen

(10) Patent No.: US 6,477,334 B1
(45) Date of Patent: Nov. 5, 2002

(54) ELECTROMOTIVE REVERSING CAR CAMERA

(76) Inventor: Chia-Meng Chen, 3F, No. 328-4, Sec. 2, Shpai Rd., Taipei City (TW)

( * ) Notice: Subject to any disclaimer, the term of this patent is extended or adjusted under 35 U.S.C. 154(b) by 0 days.

(21) Appl. No.: 09/668,453

(22) Filed: Sep. 25, 2000

(30) Foreign Application Priority Data

Feb. 1, 2000 (TW) .......................................... 089201844

(51) Int. Cl.$^7$ ........................ G03B 17/48; G03B 19/00; G03B 29/00; G06F 17/10; G06G 7/78
(52) U.S. Cl. ...................................... 396/429; 701/301
(58) Field of Search ................................. 396/429, 427; 348/148; 701/301

(56) References Cited

U.S. PATENT DOCUMENTS

| | | | | |
|---|---|---|---|---|
| 5,006,773 A | * | 4/1991 | Goldberg | 318/696 |
| 5,027,200 A | * | 6/1991 | Petrossian et al. | 348/148 |
| 5,121,200 A | * | 6/1992 | Choi | 348/148 |
| 5,289,321 A | * | 2/1994 | Secor | 348/148 |
| 5,523,811 A | * | 6/1996 | Wada et al. | 396/429 |
| 5,541,681 A | * | 7/1996 | Cocca et al. | 396/389 |

* cited by examiner

Primary Examiner—Christopher Mahoney
(74) Attorney, Agent, or Firm—Rosenberg, Klein & Lee

(57) ABSTRACT

An electromotive reversing car camera, especially a electromotive reversing car camera mounted in a car number plate. When the car is not actuated, the camera can be closed automatically for avoiding to be destroyed. When the car is actuated, the lens of the camera is opened for monitoring the rear side condition of the car by the driver so as to assist the monitoring the dead point which can not be viewed through the back view mirrors of the car. When the car is entered into a reverse (R) stage, the lens of the camera can be moved downwards for monitoring the condition of the load for avoiding collision with a child or other dangerous object. The functions of the present invention is that as the car is stopped, the camera is protected from damaged. When the car is actuated, the lens of the camera can be opened and moved automatically for taking a photograph. Further, the image can be transferred to a monitor for being viewed by the driver to adjust the condition of the load so as to drive safely.

18 Claims, 15 Drawing Sheets

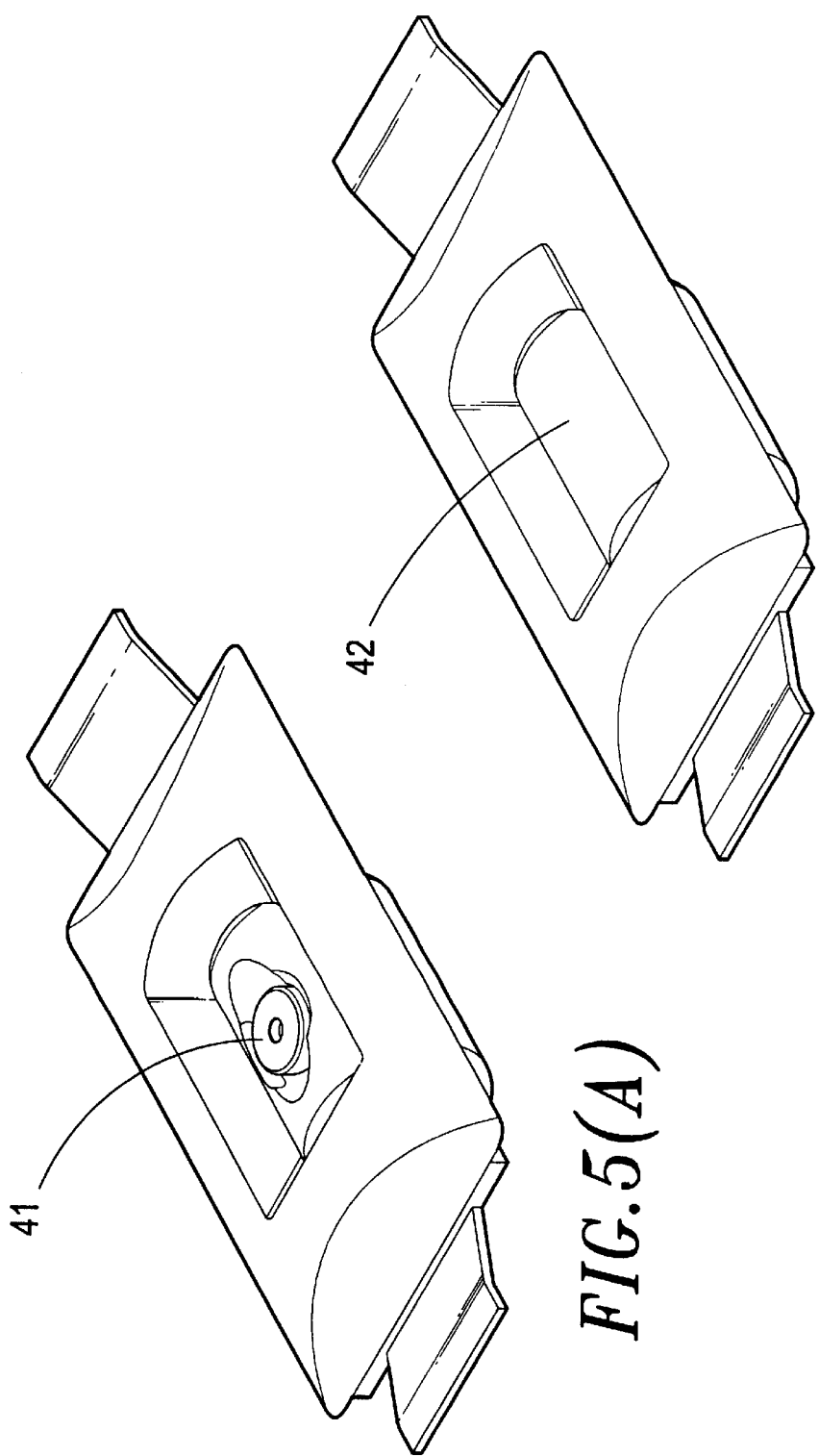

US 6,477,334 B1

ELECTROMOTIVE REVERSING CAR CAMERA

FIELD OF THE INVENTION

The present invention relates to an electromotive reversing car camera, and especially to an electromotive reversing car camera installed at or near a car license plate. As the car is stopped, the lens of the camera can be closed automatically. As the car is moving, the lens of the camera can be opened through a power source turn on, or ACCON actuation, input for monitoring an area behind the car. As the car is reversed, the lens of the camera can be moved downwards automatically for more closely monitoring the area immediately to the car's rear.

BACKGROUND OF THE INVENTION

The fixed type reversing car camera known in the prior art is mounted at a rear side of a car. However, this design has numerous disadvantages. The lens of the camera remains exposed at all times. When the car is stopped, it remains exposed for easy damage. Moreover, since cars are of various types, it is necessary to adjust each camera for the particular height and orientation of a given car, but this is tedious and inconvenient. Some employ components such as an assistant safety switch, a micro switch, or a photo coupler. While a simple electromotive reversing car camera is often necessary to rotate easily to a specific position, many sensors for detecting signals are necessary in such prior art camera types. Such sensors are mounted in the traveling path of the camera. The resulting structure is both complex and inefficiently realized; hence, the volume is too large.

In another prior art camera, a stepping motor is necessary. Through the proper number of pulses, the current restoring signal for an inverse image can be detected; however, in such a motor, the construction and motor are intrinsically confining. The torque to the D. C. motor is often too small. In addition, high torque is necessary to drive a standard camera, yet a camera with a large volume is necessary. As a result, the required cost and mounting space prove to be excessive.

Consequently, the prior art approach of restoring an image from an inverse image has drawbacks, and yields less than desirable technology. Therefore, a novel electromotive reversing car camera is necessary for improving upon the drawbacks in the prior art.

SUMMARY OF THE INVENTION

Accordingly, the primary object of the present invention is to provide a programmable electromotive reversing car camera, in which the lens of a camera can move through 180 degrees. Thereby, the lens of the camera may be hidden as the car is stopped, so as to be protected from being damaged.

Another object of the present invention is to provide a programmable electromotive reversing car camera, in which the lens of a camera can move through 180 degrees, to thereby be rotatable to view a precise region at the rear side as the car is moved, so as to monitor conditions at that rear side region.

A further object of the present invention is to provide a programmable electromotive reversing car camera which enables a car operator to efficiently monitor conditions at the car's rear to avoid reversing into a trench, hitting a child, or colliding with obstacles.

Another object of the present invention is to provide a programmable electromotive reversing car camera, in which the lens of the camera can be controlled from the driver's seat to be rotated to a memory position.

The present invention with the aforesaid advantages preferably employs a D. C. motor with a rotation angle of 180 degrees which is divided into a plurality of sections. As the motor rotates to a section, a variable resistor is set to a resistance corresponding to the section. From the resistance, the position of the motor can be determined. The parametric data pertaining to these small sections can be preset and stored in memory. Through a control circuit, the camera can be rotated to stopping, moving, and reversing positions. The electromotive reversing car camera of the present invention includes a manual/auto signal input, a control processing circuit, a motor driving circuit, and a load.

BRIEF DESCRIPTION OF THE DRAWINGS

Embodiments of the present invention will hereinafter be described, by way of example, with reference to the accompanying drawings, in which:

FIGS. 5A–5B are schematic perspective views showing the opened and closed configurations of the electromotive reversing car camera of the present invention.

DESCRIPTION OF THE PREFERRED EMBODIMENTS

Figure 1:
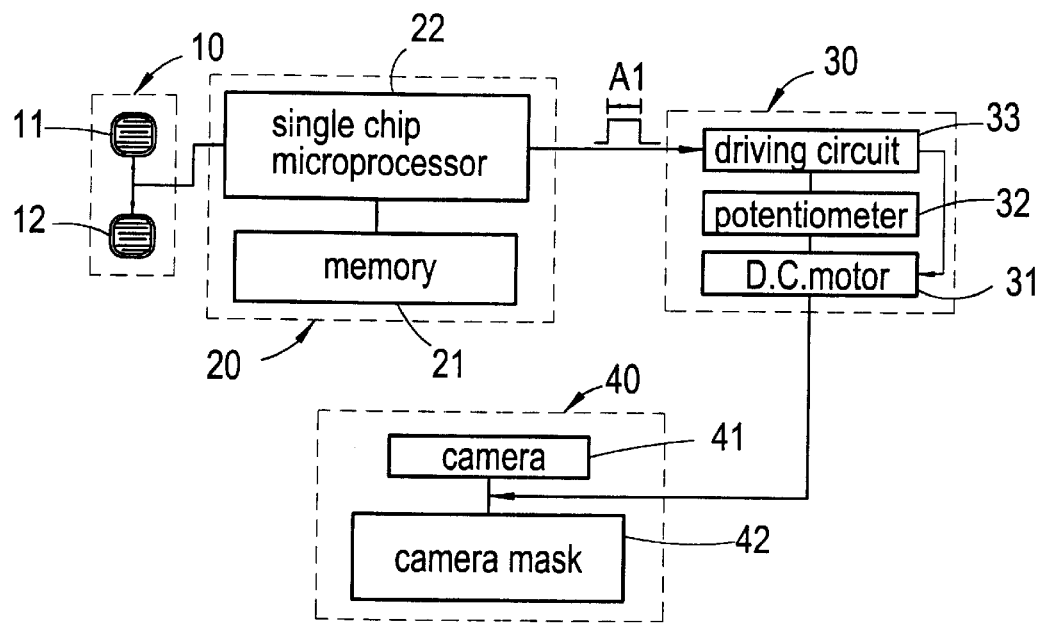
FIG. 1 is a block diagram of a single chip microprocessor in the present invention.

With reference to FIG. 1, a block schematic view of the electromotive reversing car camera according to the present invention is illustrative. The electromotive reversing car camera of the present invention comprises a manual/auto signal input 10, a control processing circuit 20, a motor driving circuit 30, and a load 40. The manual/auto signal input 10 includes in this embodiment an upward button 11 and a downward button 12. Upon clicking the upward button 11, the lens of the camera will move upwards. Upon clicking the downward button 12, the lens of the camera will move downwards. Upon simultaneously clicking both the upward button 11 and the downward button 12, the lens of the camera will stop at a memory position. The control processing circuit 20 includes an electrically erasable and programmable memory 21 (for example, EEPROM) and related software. Positioning data at three points are preset for a D. C. motor 31 of the motor driving structure 30, such that the preset three points can be processed by the control processing circuit and then stored in memory. The camera 41 and the camera mask 42 may then be driven to be at a first point for stopping, at a second point for moving, and at a third point for reversing.

After the manual/auto signal input 10 inputs a signal, the single chip microprocessor 22 of the control processing circuit 20 will read or write data and perform and action.

Then, a signal is outputted to the motor driving structure 30. The motor driving structure 30 has a D. C. motor 31, a potentiometer 32, and a driving circuit 33. After decelerating, the D. C. motor 31 will load a load 40 directly and at the same time rotate the potentiometer 32. That is, as the D. C. motor 31 rotates, the potentiometer 32 rotates synchronously. The driving circuit 33 of the motor driving structure 30 formed with such suitable components as a signal generating circuit, an amplifying circuit, and the like, is described in following paragraphs in greater detail with reference to FIG. 3. The reference negative pulse signal generated from the reference pulse signal of the driving circuit 33 and the positive pulse signal outputted from the control processing circuit 20 are first described with reference to a simple formula.

Figure 2:
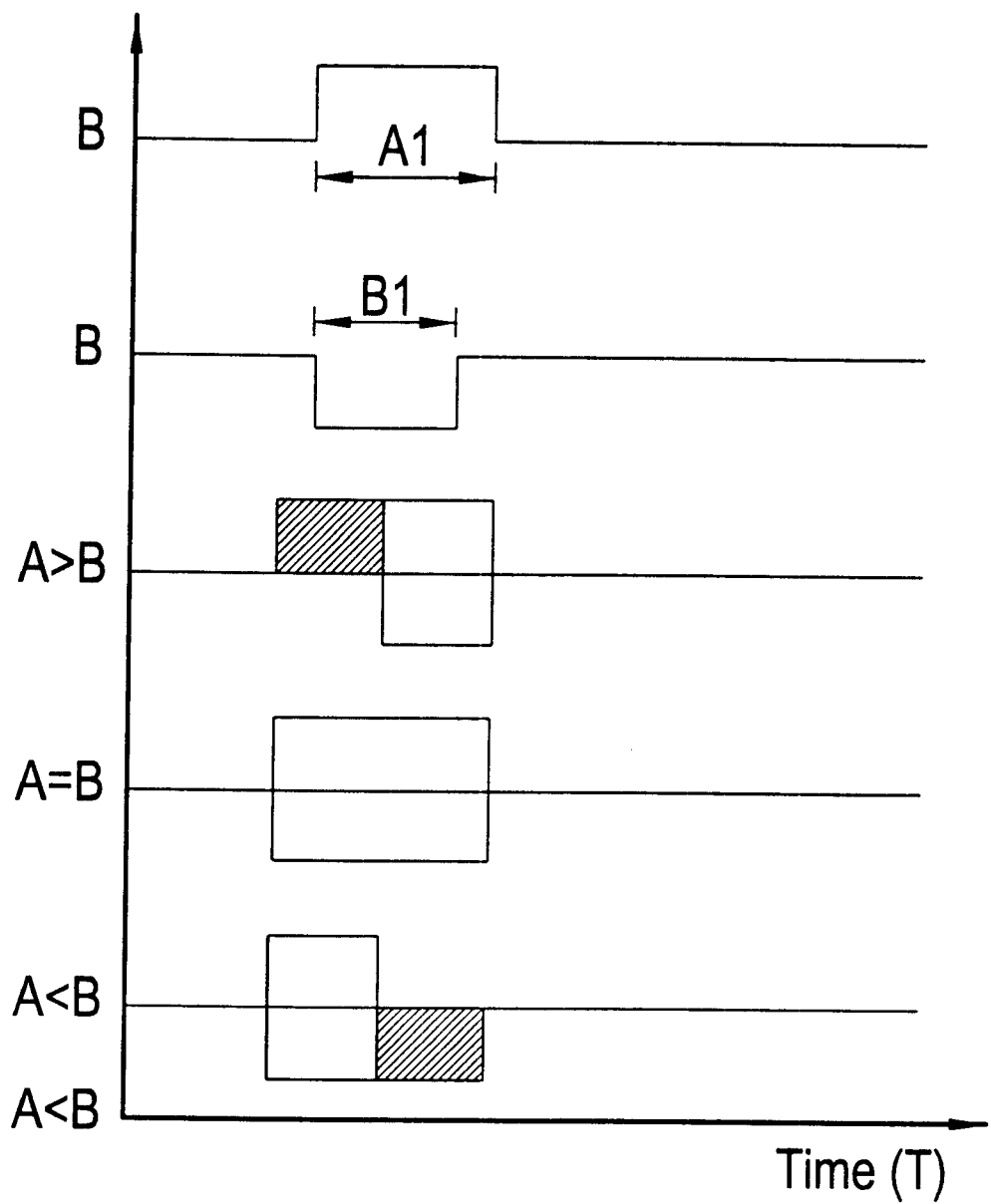
FIG. 2 is a graph illustrating time plots for various exemplary signals in one embodiment of the present invention.

Referring to FIG. 2, symbol A represents the positive output pulse signal of the control processing circuit 20 having a pulse width of A1; while symbol B represents a negative pulse signal having a certain pulse width B1 which is generated from the reference pulse signal of the motor driving structure 30. The input pulse signal A is reversed in polarity relative to the reference pulse signal B for convenient comparison. A comparison of A1 and B1 is made, whereby:

(1) If in the comparison, A1–B1<0, i.e. A1 is smaller than B1, then the differential pulse width is of the same polarity as B1, i.e. the differential pulse width is negative. Then this negative differential pulse width is stretched by a pulse stretcher; and, after being amplified by an amplifier, drives the D. C. motor 31 to rotate in a reverse direction.

(2) If A1–B1>0, i.e. A1 is larger than B1, then the differential pulse width is of a polarity opposite that of B1, i.e. the differential pulse width is positive. Then the positive differential pulse width is stretched by a pulse stretcher; and, after being amplified by an amplifier, drives the D. C. motor 31 to rotate in a positive direction.

(3) If A1–B1=0, i.e. A1 equals B1, then the differential pulse width is 0, i.e. there is no differential pulse width. The pulse stretcher and amplifier take no action, and the D. C. motor 31 stops.

Figure 3:
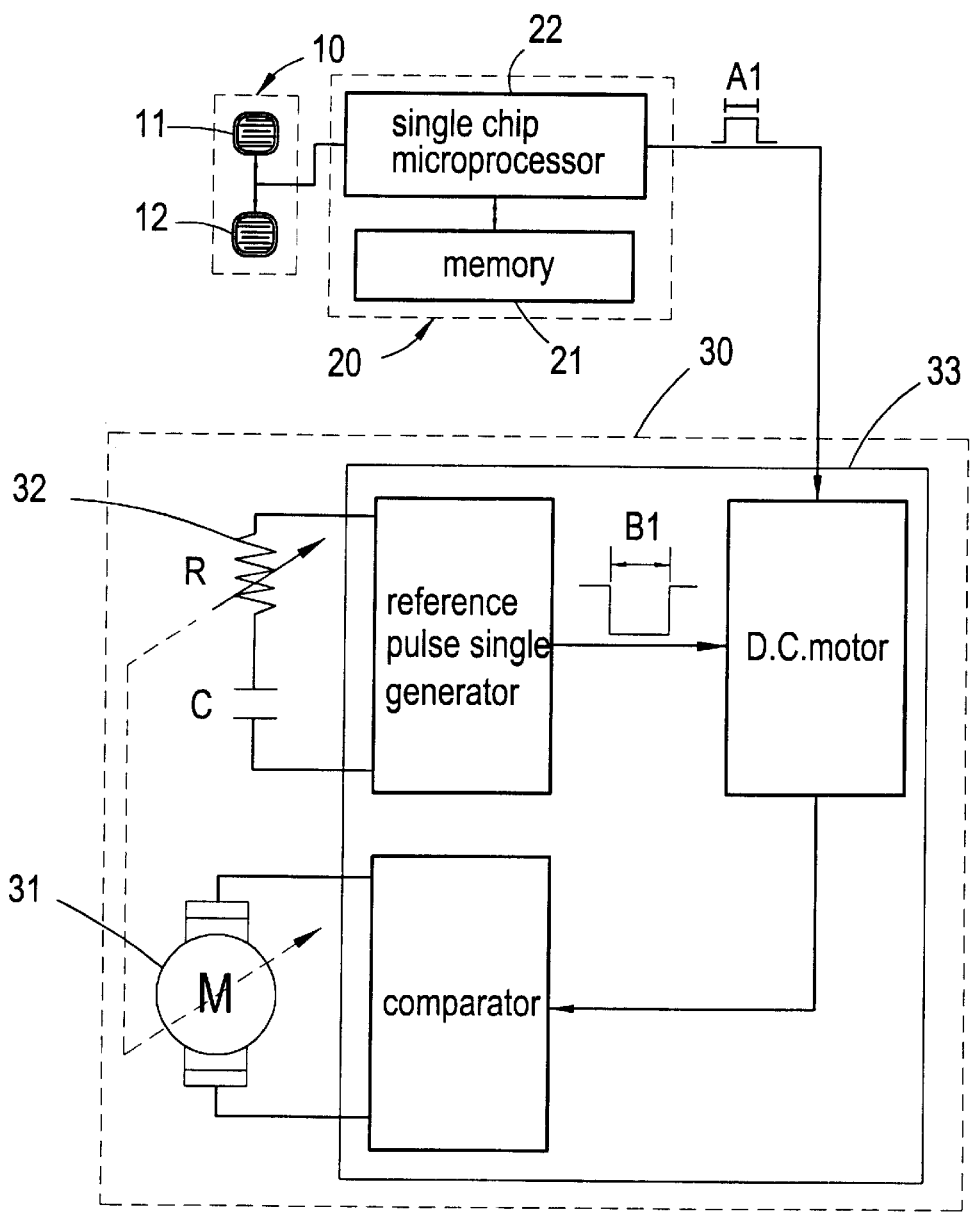
FIG. 3 is a circuit block diagram of a reference pulse signal generator.
Figure 3A:
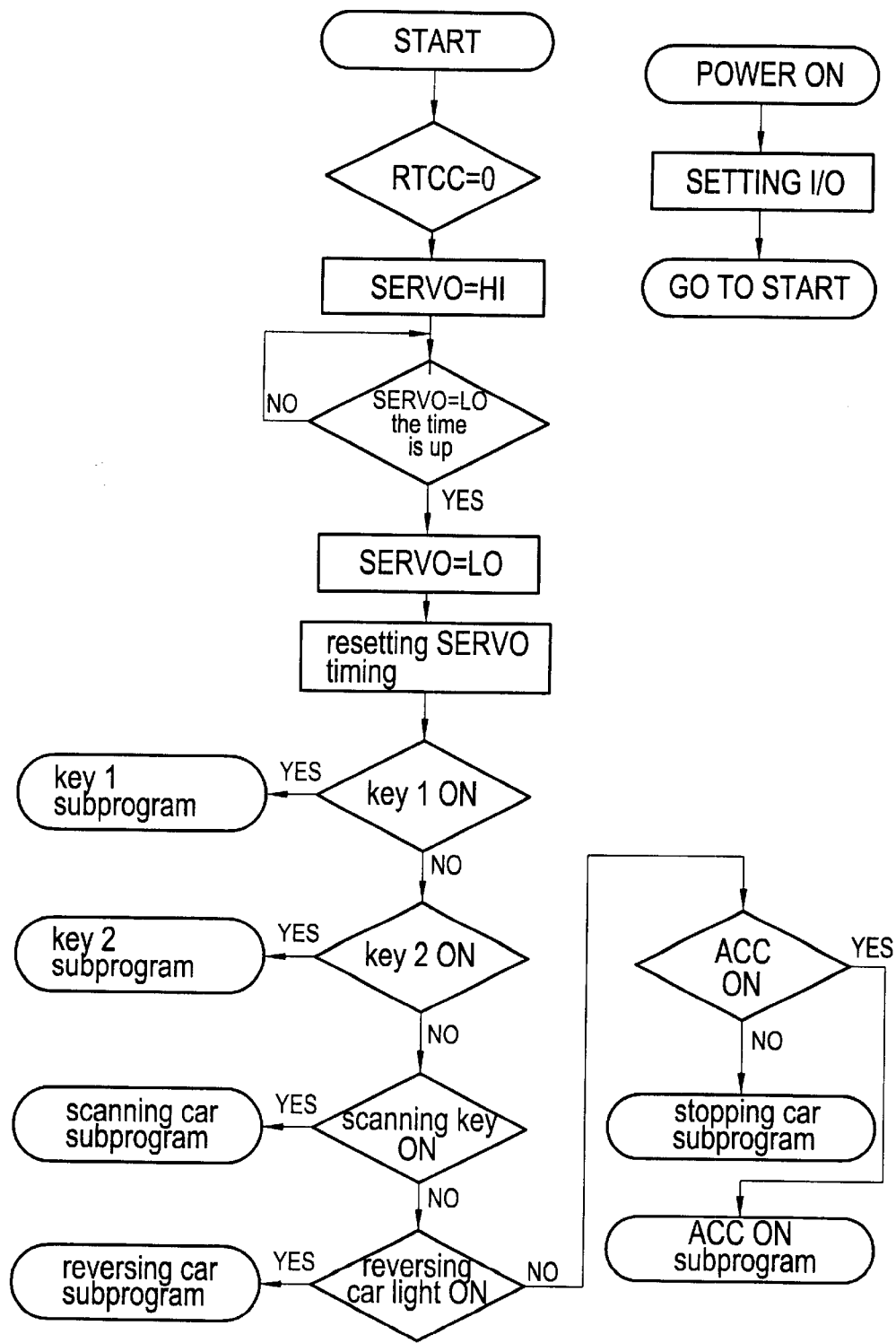
FIGS. 3A–3J are flow diagrams of certain aspects of control software employed in one embodiment of the present invention.

The generation of the reference pulse signal B with a predetermined pulse width using the reference pulse signal generator is next described. With reference to FIG. 3, when the manual/auto signal input 10 inputs a signal into the control processing circuit 20, a positive input pulse signal enters a comparison circuit in the driving circuit 33 of the motor driving structure 30 and triggers a trigger circuit therein, such that the reference pulse signal generator generates a negative pulse signal B. The width B1 of this signal B is determined by a time constant from multiplying the resistance R with the capacitance C of the potentiometer. Assuming the capacitance is constant, the potentiometer 32 of the motor driving structure 30 will acquire a reference pulse signal. Since the rotary shaft of the D. C. motor in the motor driving structure 30 is driven by the rotary shaft of the potentiometer, as the D. C. motor 31 rotates, the potentiometer 32 will rotate synchronously. That is to say, when the D. C. motor 31 rotates, a series of different reference pulse signals is generated, which is amplified with the input pulse signals from the control processing circuit until the pulse widths of the input pulse signal and the reference pulse signal are equal. At that point, the rotation of the motor is stopped. That is, the rotation of the motor is matched with the input of the manual/auto signal input 10 for achieving the functions of control and memory.

Figure 1A:
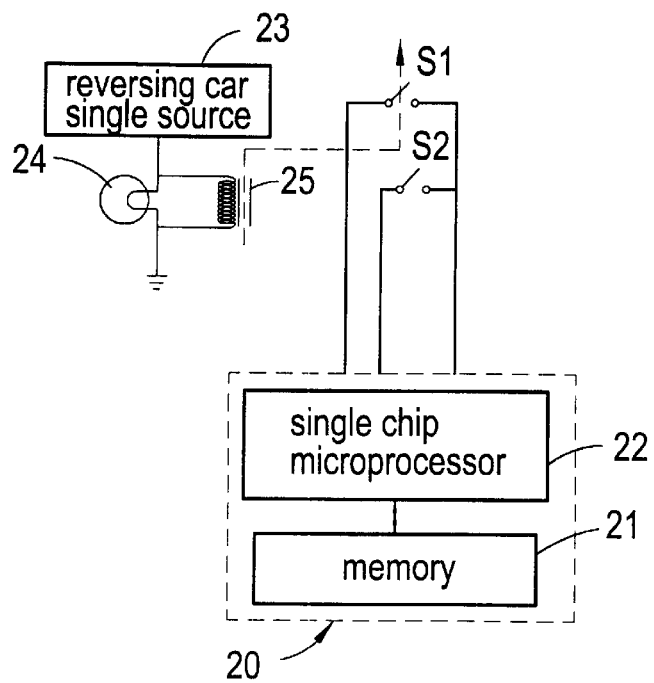
FIG. 1A is a circuit block diagram of a control processing circuit in the present invention.

Referring to FIG. 1A in the block diagram of the control processing circuit according to the present invention, distribution wires of the control processing circuit controlled and operated by a driver are described. As the driver enters into a car and actuates a key to close the switch S2 as the car is in ACCON condition, the single chip microprocessor 22 acquires a trigger signal of the ACCON positive (+) condition, then actuates the ACCON subroutine control code in the memory 21 for performing the function of adjusting the lens of the camera 31 to be precisely set facing the rear side. If the car is thereafter operated with the gear setting of the car at an R position (reversing the car), then the car will light the reversing car light through the reversing car light source 23. The current lighting up the reversing car light is also provided to a relay connected in parallel to close switch SI. A positive trigger signal (B+) will transfer to the reversing car input end of the single chip microprocessor 22. Then the reversing car subroutine control code in the memory 21 will adjust the lens of the camera 41 to be at the lower angle so that reversing of the car may be facilitated.

Referring to FIGS. 3(A)–3(J), a flow diagram of the control software program of the present invention is illustrated. In this process, FIG. 3A pertains to a primary process control code for identifying actuation, stop, scanning, car reversing, use of control key, etc., and for setting various parameters such that the single chip microprocessor 22 can perform the secondary process control code in the memory 21 and thereby enable system operation. Other than the aforesaid primary process control code, each of the secondary process control codes will be described in following paragraphs for completeness.

Figure 3B:
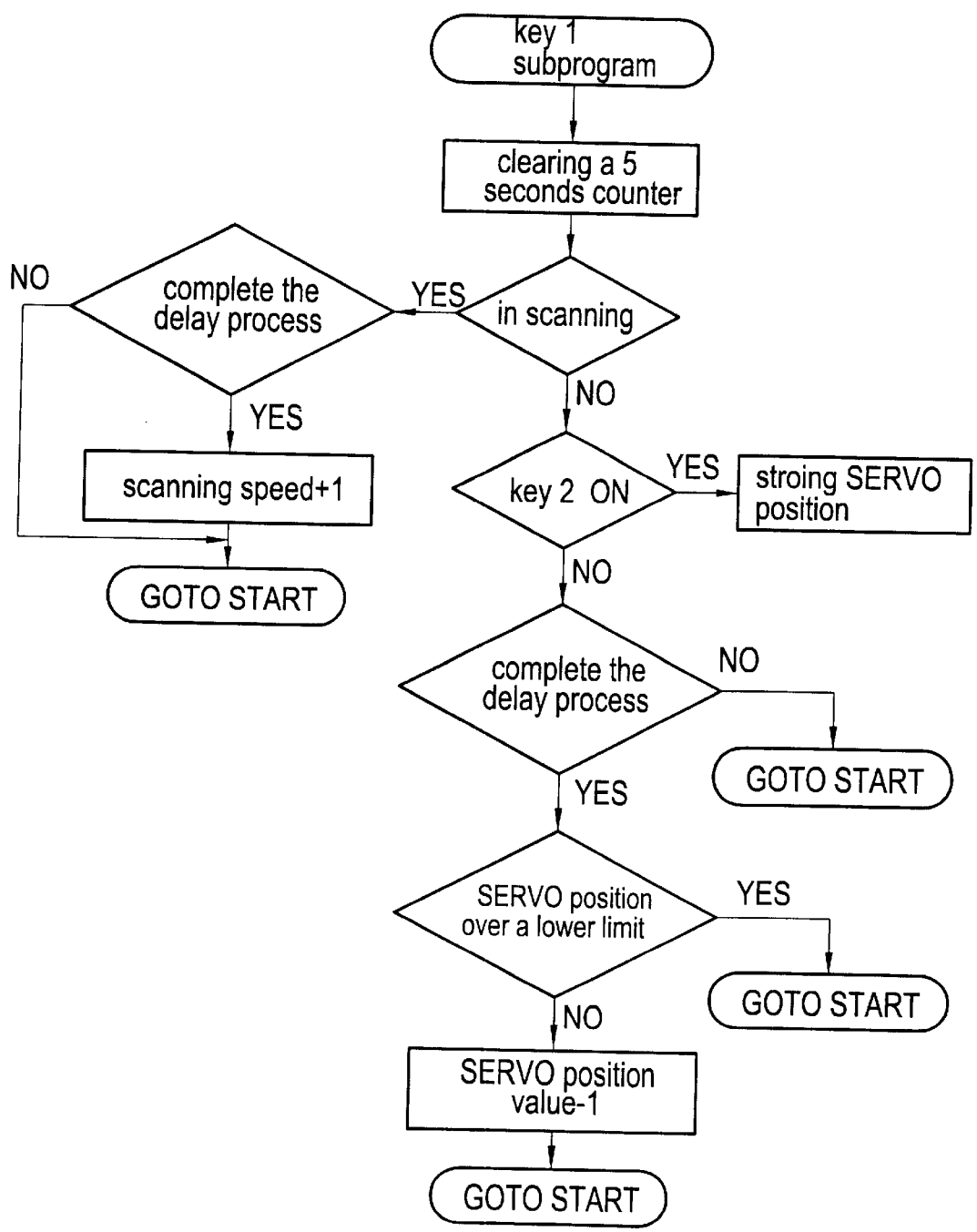
Figure 3C:
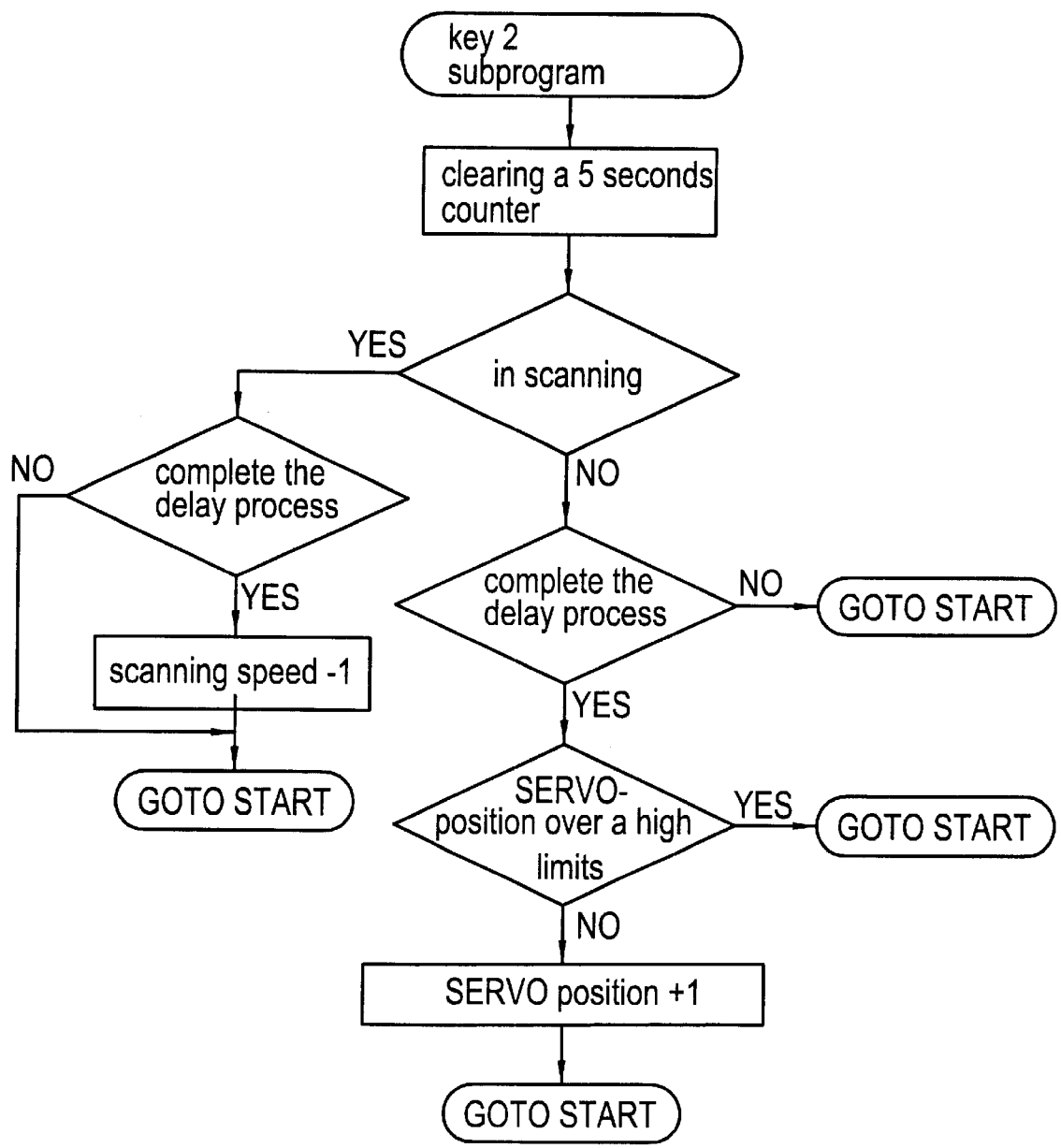

As shown in FIG. 3B, a process for the secondary process control code of a key 1 is illustrated, which serves to control the lower limit about the movement of the camera 41. The current position of the camera 41 is stored with the action of a key 2. FIG. 3C pertains to a process for the secondary process control code of the key 2, which corresponds to the process of FIG. 3B for controlling the upper limit of the movement of the camera 41.

Figure 3D:
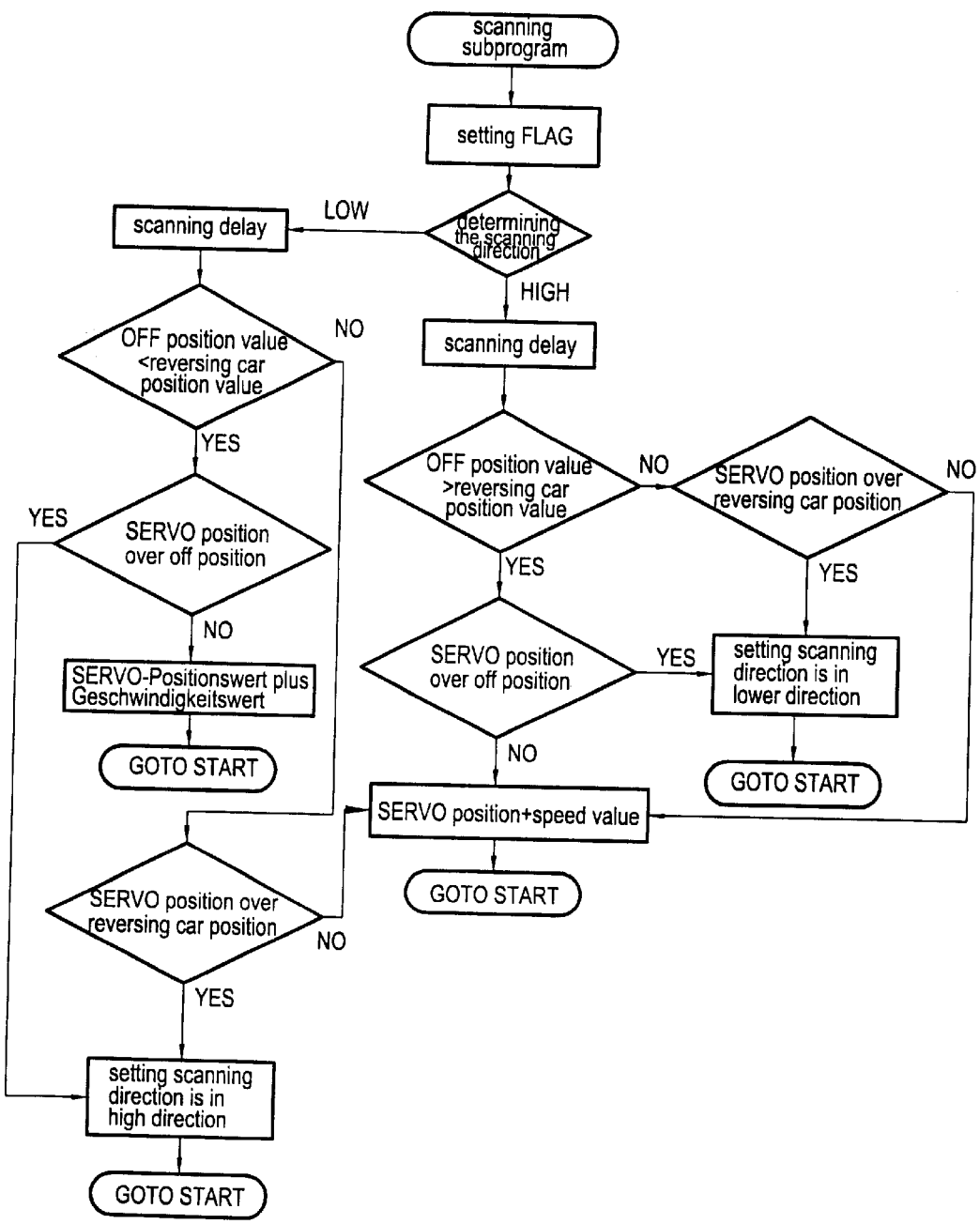
Figure 3E:
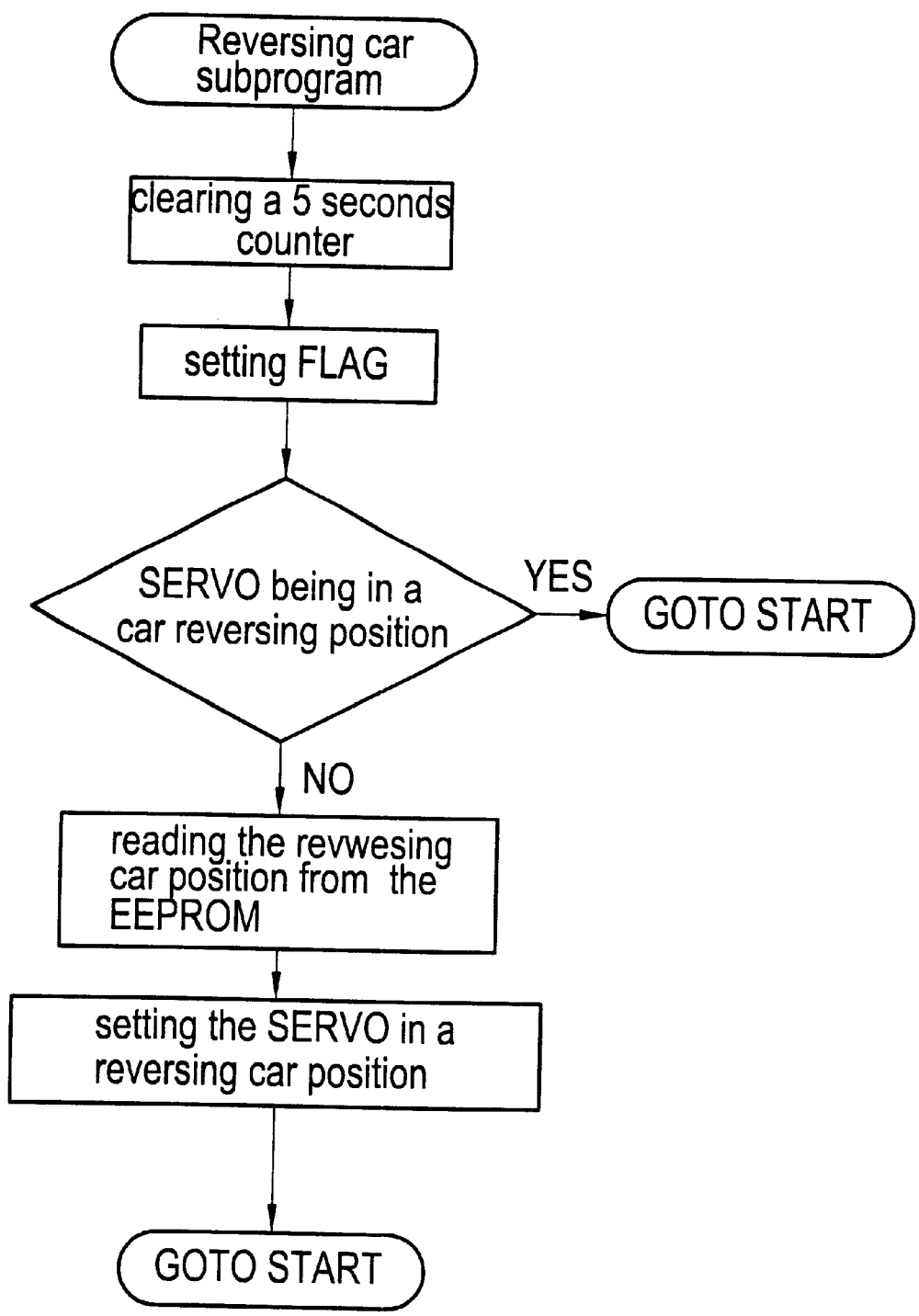

FIG. 3D pertains to a process for the secondary process control code of scanning for determining whether the current position of the camera 41 is at a position for monitoring during car reversing, so as to adjust the position of the camera 41 automatically to a correct position. FIG. 3E pertains to a process for the secondary process control code of scanning for writing the position of reversing a car on the EEPROM for provision to a program for further comparison.

Figure 3F:
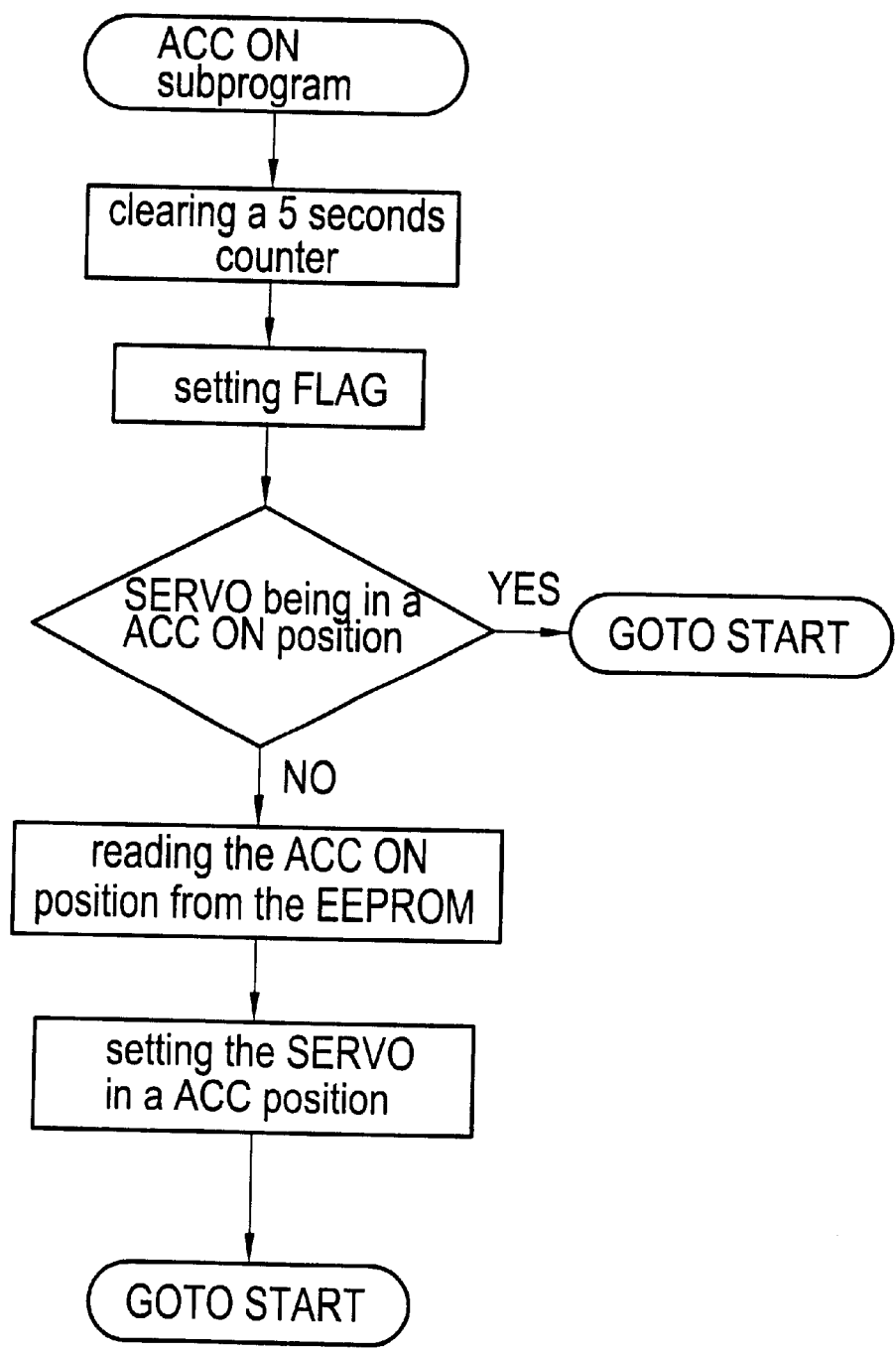
Figure 3G:
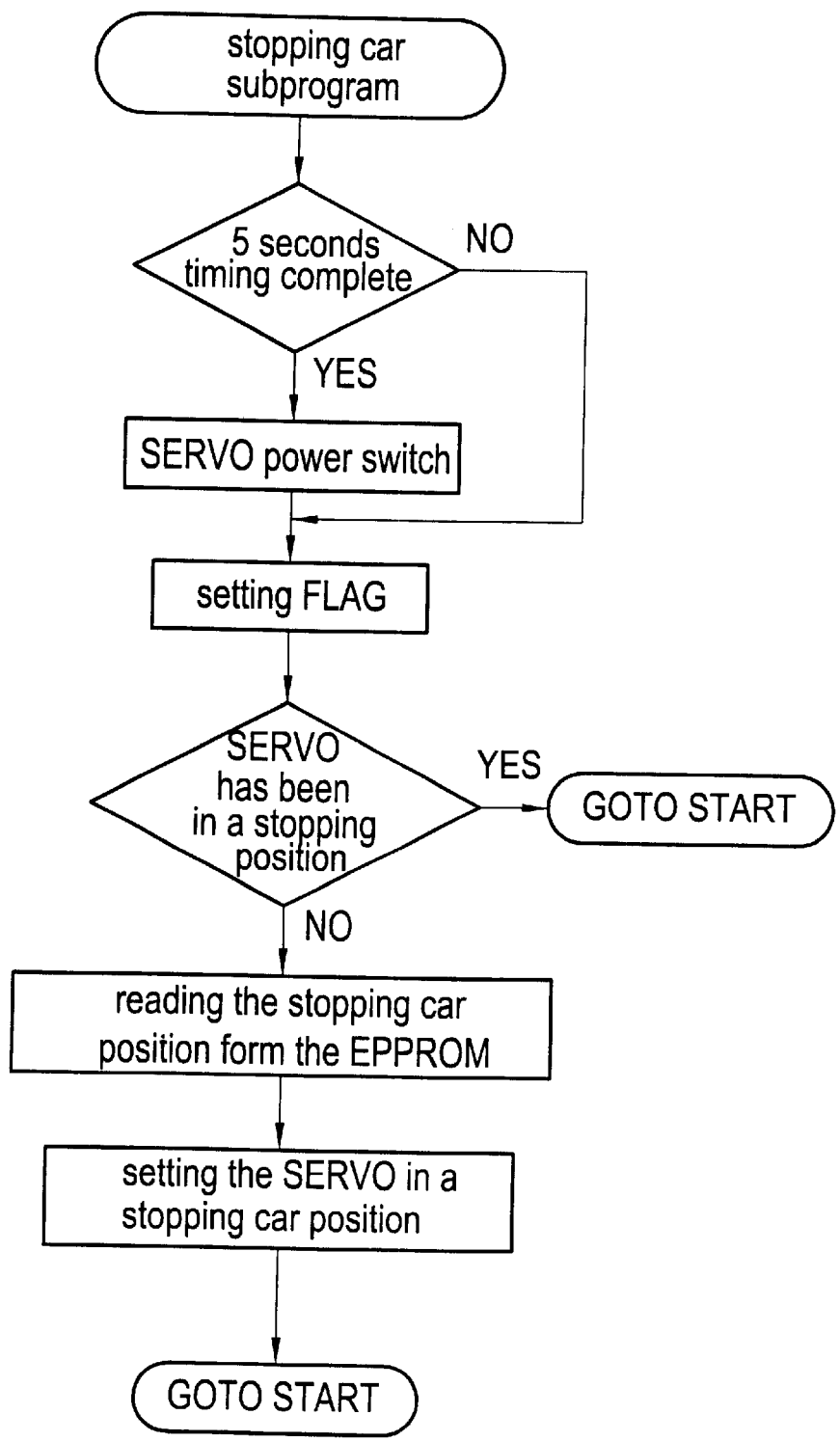

FIG. 3F pertains to a secondary process control code for the ACCON function, in which as a car is actuated in an ACCON condition, the ACCON position in the EEPROM is written automatically for provision to a program for comparison. The camera 41 may thereby be moved to the correct ACCON monitoring position. FIG. 3G pertains to a process for the secondary process control code for the stop function. As the car is stopped, the process will read the ACCON position in the EEPROM for provision to a program for further comparison. The camera 41 may thereby be moved to a correct stopping position.

Figure 3H:
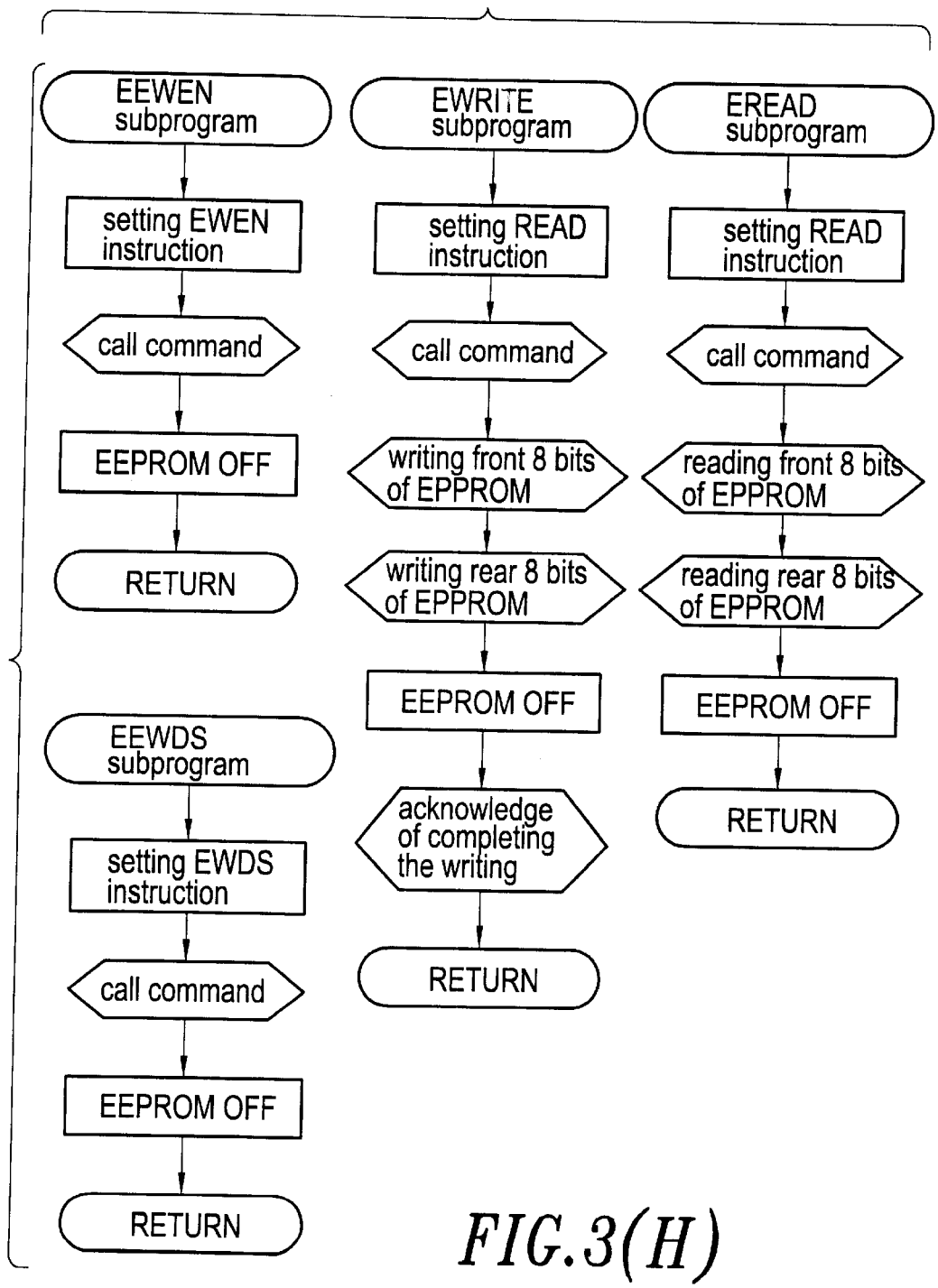
Figure 3I:
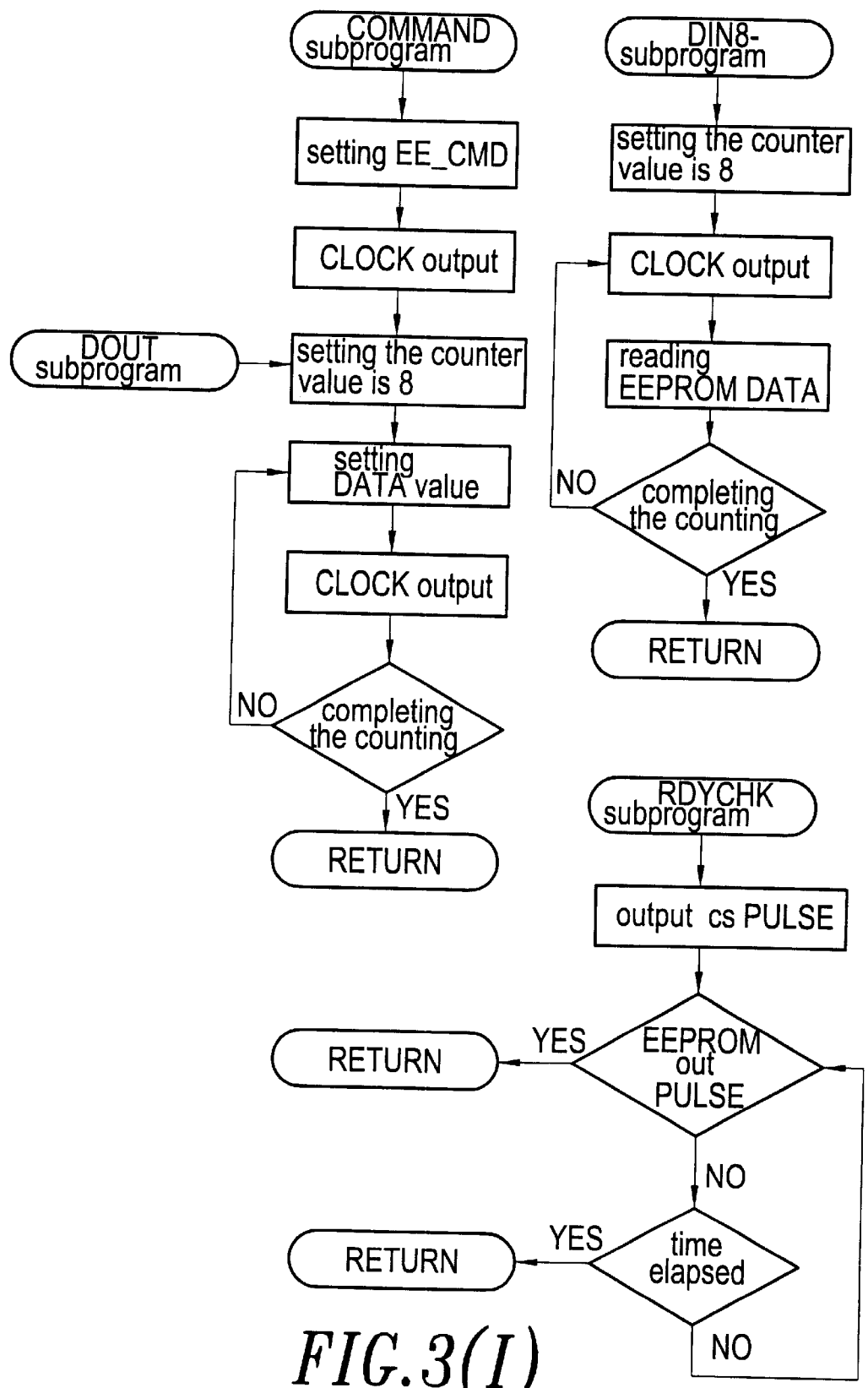
Figure 3J:
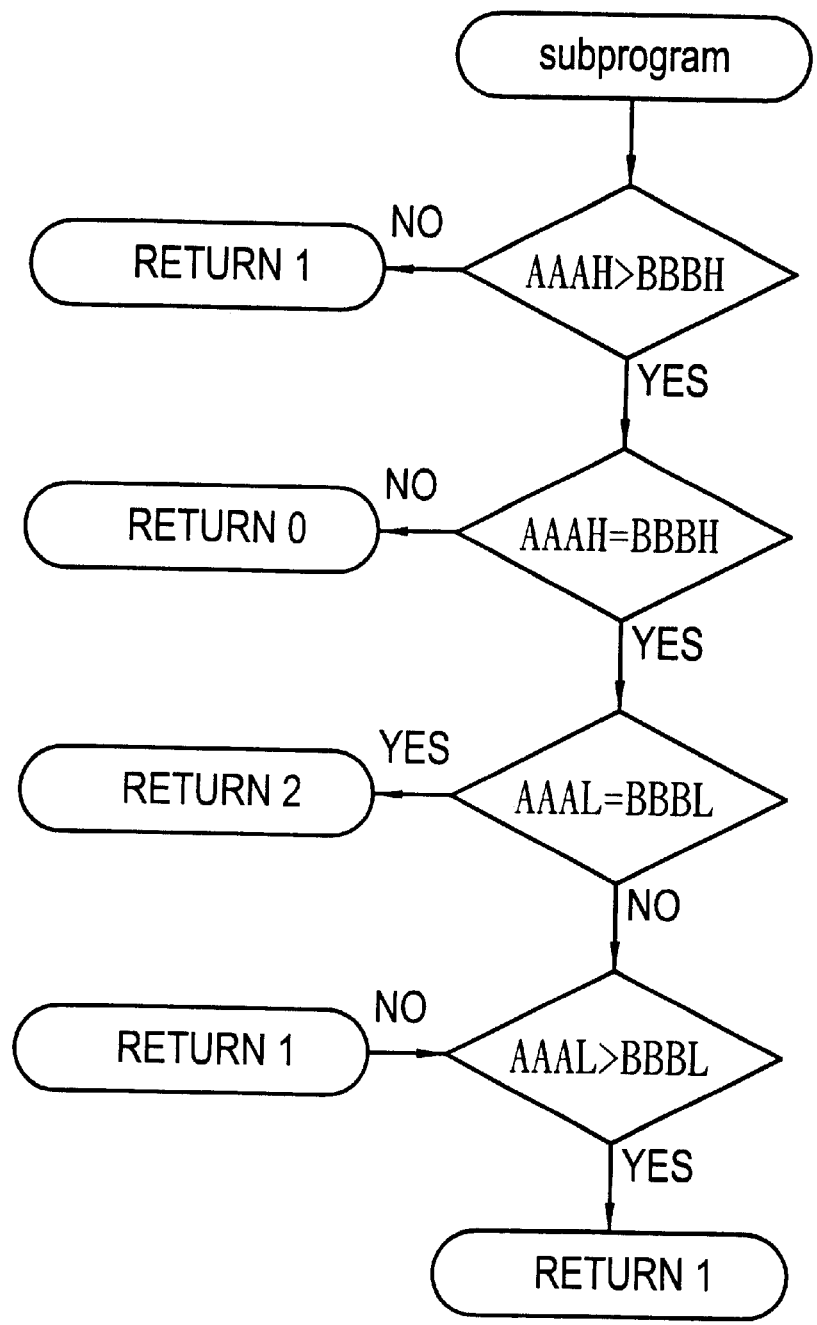

FIGS. 3H to 3I show the steps for writing to and reading from the EEPROM. FIG. 3J pertains to a process for the comparison subroutine, wherein the output pulse signal with a predetermined pulse width outputted from the control processing circuit 20 is compared with the negative pulse signal B with a predetermined pulse width generated from the reference pulse signal of the motor driving structure 30. This occurs in order to determine whether the D. C. motor 31 is in a state of positive rotation, negative rotation, or stop, so that automatic adjustment may be effected.

Figure 4A:
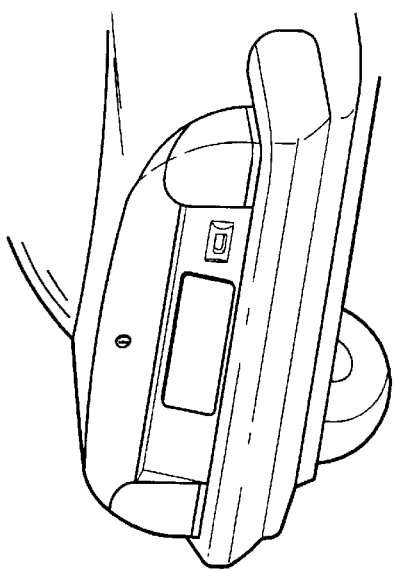
FIGS. 4A–4C are schematic views showing the camera of the present invention being at the stopping, moving, and reversing configurations.
Figure 4C:
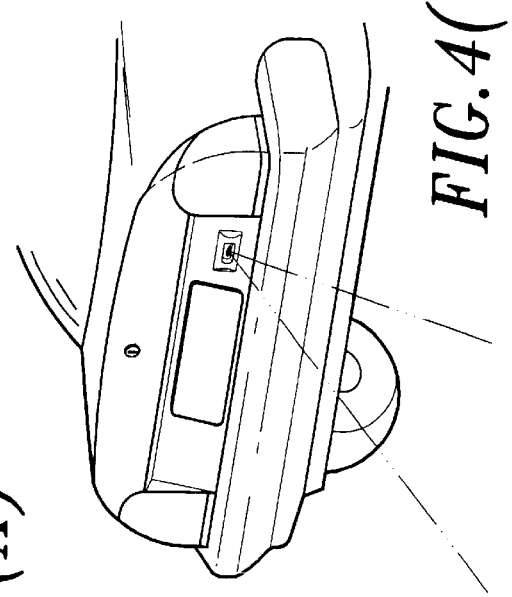
Figure 4B:
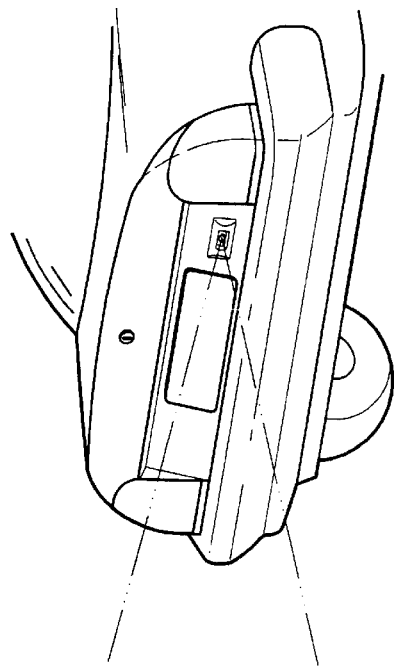

Referring to FIGS. 4A, 4B, and 4C, the three stopping, moving, and reversing positions of the camera 41 of the present invention are illustrated. In the stopping position shown in FIG. 4A, as the key is rotated to an OFF position, the camera mask 42 is automatically positioned so that the camera remains protected. In the moving position of FIG. 4B, as the key is rotated to an ACCON position, the camera 41 and camera mask 42 are automatically positioned to their opened settings, such that the camera 41 is adjusted to be precisely directed rearward for monitoring. In the reversing position shown in FIG. 4C, when the driver sets the car in a reversing gear, the camera 41 will adjust itself downward in orientation to view the immediate rear of the car. Thus, in reversing the car, the driver may monitor whether any obstacle is in the path. The driver can thereby operate the car safely.

Referring to FIGS. 5A and 5B, schematic perspective views show the camera i its actuated and closed states. FIG. 5A shows the camera 41 in its opened position for actuation; and, FIG. 5B shows the camera 41 in its closed position for periods of non-use.

The present invention has the following advantages:
1. Comparing with the prior art designs employing a D. C. motor, a plurality of sensors for detecting signals are unnecessary in the present invention, even though the D. C. motor may rotate to a predetermined position. The waste of resources, complex structure, difficulty in maintenance, and excessive bulk of the prior art are reduced by the present invention.
2. Comparing with the prior art employing a step motor, the lens of the camera may be set in its protected state via switch activation. Furthermore, the camera is suitable for cars with different heights. It is only necessary to push a button, whereby the orientation of the camera may be adjusted. Therefore, efficiency in installation is improved.

It will be appreciated that other modifications and variations may be made to the embodiments as described and illustrated within the scope of the present invention as defined in the following claims.

I claim:
1. An electromotive reversing car camera comprising:
a manual/auto signal input for generating an input signal directly through an operation of the user or a digital switch;
a control processing circuit for controlling the actuation of a motor driving structure, thereby a load on the motor driving structure being rotated bidirectionally, or stopped, and set to a respective position;
the control processing circuit storing a program and controlling the motor driving structure for driving a motor to control the cameras;
the load including a camera and camera mask;
wherein the motor drives the camera to rotate, a supporting mask structure being disposed about a base of the camera and having a notch with a size of approximately a lens of the camera; as the lens of the camera is rotated to the notch, then the camera takes a photograph of the rear side of the car.
2. An electromotive reversing car camera comprising:
a manual/auto signal input for generating an input signal directly through an operation of the user or a digital switch;
a control processing circuit for controlling the actuation of a motor driving structure, thereby a load on the motor driving structure being rotated bidirectionally, or stopped, and set to a respective position;
the control processing circuit storing a program and controlling the motor driving structure for driving a motor to control the cameras, the control processing circuit including a PIC single chip microprocessor and an EEPROM;
the load including a camera and camera mask;
wherein the memory in the control processing circuit serves to store program control codes, including primary process control codes and secondary process control codes, the primary process control codes serving to determine the condition of actuation, stopping, scanning, reversing car, or control key, and for setting various parameters;
the secondary process control codes including a scanning secondary process control code serving to determine whether the camera has achieved a monitoring position for adjusting automatically the camera to a correct position for reversing a car, and reading the reversing car position in the EEPROM, which is provided to a program for comparison and calculation, whereby, the camera is adjusted to a correct position of reversing a car;
wherein a comparison process in the secondary process control code of the control processing circuit is performed through a comparison micro step of the secondary process control code for incrementally comparing a positive outputted pulse signal with a predetermined pulse width outputted from the control processing circuit and a negative pulse signal with a determined pulse width generated from a reference pulse signal of the motor driving structure for determining whether a D.C. motor of the motor driving structure is in a condition of positive rotation, negative rotation or stopping.
3. An electromotive reversing car camera comprising:
a manual/auto signal input for generating an input signal directly through an operation of the user or a digital switch;
a control processing circuit for controlling the actuation of a motor driving structure, thereby a load on the motor driving structure being rotated bidirectionally, or stopped, and set to a respective position;
the control processing circuit storing a program and controlling the motor driving structure for driving a motor to control the cameras, the control processing circuit including a PIC single chip microprocessor and an EEPROM;
the load including a camera and camera mask;
wherein the memory in the control processing circuit serves to store program control codes, including primary process control codes and secondary process control codes, the primary process control codes serving to determine the condition of actuation, stopping, scanning, reversing car, or control key, and for setting various parameters;
the secondary process control codes including an actuation secondary process control code serving to read an ACCON position parameter in the EEPROM as the vehicle is operated, which is provided to a program for comparison and calculation, thereby, the camera is adjusted to a monitoring position;
wherein a comparison process in the secondary process control code of the control processing circuit is per- formed through a comparison micro step of the secondary process control code for incrementally comparing a positive outputted pulse signal with a predetermined pulse width outputted from the control processing circuit and a negative pulse signal with a determined pulse width generated from a reference pulse signal of the motor driving structure for determining whether a D.C. motor of the motor driving structure is in a condition of positive rotation, negative rotation or stopping.

4. An electromotive reversing car camera comprising:

a manual/auto signal input for generating an input signal directly through an operation of the user or a digital switch;

a control processing circuit for controlling the actuation of a motor driving structure, thereby a load on the motor driving structure being rotated bidirectionally, or stopped, and set to a respective position;

the control processing circuit storing a program and controlling the motor driving structure for driving a motor to control the cameras, the control processing circuit including a PIC single chip microprocessor and an EEPROM;

the load including a camera and camera mask;

wherein the memory in the control processing circuit serves to store program control codes, including primary process control codes and secondary process control codes, the primary process control codes serving to determine the condition of actuation, stopping, scanning, reversing car, or control key, and for setting various parameters;

the secondary process control codes including a stopping secondary process control code serving to read an ACCON position parameter in the EEPROM as the car is stopped, which is provided to a program for comparison and calculation, thereby, the camera is adjusted to a stopping position;

wherein a comparison process in the secondary process control code of the control processing circuit is performed through a comparison micro step of the secondary process control code for incrementally comparing a positive outputted pulse signal with a predetermined pulse width outputted from the control processing circuit and a negative pulse signal with a determined pulse width generated from a reference pulse signal of the motor driving structure for determining whether a D.C. motor of the motor driving structure is in a condition of positive rotation, negative rotation or stopping.

5. An electromotive rear monitoring camera system for a vehicle comprising:

an input unit for generating an input actuation signal;

a load disposed in pivotally displaceable manner within a support structure having an opening formed thereon, said load including a camera portion;

a motor driving unit coupled to said load, said motor being operable to reversibly drive the pivotal displacement of said load between a plurality of predefined angular positions, said camera portion of said load being visible through said support structure opening at least at a first of said predefined angular positions and hidden from view through said support structure opening at a second of said predefined angular positions; and, a control processing circuit coupled to said motor driving unit, said control processing circuit being operable responsive to said input actuation signal to control actuation of said motor driving unit.

6. The electromotive rear monitoring camera system as recited in claim 5 wherein said predefined angular positions of said load include moving, reversing, and stopped positions.

7. The electromotive rear monitoring camera system as recited in claim 5 wherein said load further includes a camera mask portion, said camera mask portion extending across said support structure opening in said second of said predefined angular positions.

8. The electromotive rear monitoring camera system as recited in claim 7 wherein said load includes a substantially cylindrical surface defining said camera mask portion, said camera being angularly displaced from said camera mask portion.

9. The electromotive rear monitoring camera system as recited in claim 5 wherein said input unit is actuable both manually and automatically.

10. The electromotive rear monitoring camera system as recited in claim 5 wherein said control processing circuit includes a single chip microprocessor and a memory device.

11. The electromotive rear monitoring camera system as recited in claim 10 wherein said single chip microprocessor is a PIC single chip microprocessor, and said memory device includes an EEPROM.

12. The electromotive rear monitoring camera system as recited in claim 11 wherein said EEPROM is programmably configured to store a plurality of program codes including primary process control codes for determining the angular position of said load and the actuation state of said electromotive rear monitoring camera system, and for setting a plurality of predetermined parametric values.

13. The electromotive rear monitoring camera system as recited in claim 12 wherein said program control codes stored in said EEPROM include secondary process control codes for controlling upper and lower limits of travel for said camera portion, and for recording a current position of said camera portion.

14. The electromotive rear monitoring camera system as recited in claim 12 wherein said program control codes stored in said EEPROM further include secondary process control codes for automatically adjusting the angular position of said camera portion between predefined monitoring and reversing positions responsive to operation of the vehicle in reverse gear.

15. The electromotive rear monitoring camera system as recited in claim 14 wherein said program control codes stored in said EEPROM wherein said secondary process control codes for automatically adjusting the angular position of said camera portion includes a micro step program code for incrementally defining said predefined angular positions of said load.

16. The electromotive rear monitoring camera system as recited in claim 12 wherein said program control codes stored in said EEPROM further include secondary process control codes for automatically adjusting the angular position of said camera portion to monitoring and stopped positions responsive respectively to the vehicle being operated in a forward drive gear and being parked.

17. The electromotive rear monitoring camera system as recited in claim 16 wherein said program control codes stored in said EEPROM wherein said secondary process control codes for automatically adjusting the angular position of said camera portion includes a micro step program code for incrementally defining said predefined angular positions of said load.

18. The electromotive rear monitoring camera system as recited in claim 5 wherein said control processing circuit is an ASIC device.

* * * * *